(12) United States Patent
Stecher

(10) Patent No.: US 6,279,916 B1
(45) Date of Patent: Aug. 28, 2001

(54) FLAT GASKET AND METHOD OF PRODUCING THE SAME

(76) Inventor: Friedhelm Stecher, Kajedeich 34, D-26386 Wilhelmshaven (DE)

( * ) Notice: Subject to any disclaimer, the term of this patent is extended or adjusted under 35 U.S.C. 154(b) by 0 days.

(21) Appl. No.: 08/973,714

(22) PCT Filed: Jun. 28, 1996

(86) PCT No.: PCT/EP96/02839

§ 371 Date: Mar. 2, 1998

§ 102(e) Date: Mar. 2, 1998

(87) PCT Pub. No.: WO97/01722

PCT Pub. Date: Jan. 16, 1997

(30) Foreign Application Priority Data

Jun. 29, 1995 (DE) ............................................. 195 23 759

(51) Int. Cl.$^7$ ................................. F16J 15/06; F02F 11/00
(52) U.S. Cl. .......................... 277/592; 277/594; 277/595
(58) Field of Search ........................................ 277/592, 593, 277/594, 595; 29/888.3

(56) References Cited

U.S. PATENT DOCUMENTS

| | | | |
|---|---|---|---|
| 2,127,372 | * | 8/1938 | Victor et al. . |
| 4,285,527 | * | 8/1981 | Connely . |
| 4,635,949 | * | 1/1987 | Lucas et al. . |
| 4,676,515 | * | 6/1987 | Cobb . |
| 4,796,897 | * | 1/1989 | Inciong . |
| 4,817,969 | * | 4/1989 | McDowell et al. . |
| 4,915,398 | * | 4/1990 | Kitagawa . |
| 5,560,623 | * | 10/1996 | Yoshino . |
| 5,582,415 | * | 12/1996 | Yoshida et al. . |
| 5,785,322 | * | 7/1998 | Suggs et al. . |

* cited by examiner

Primary Examiner—James R. Brittain
Assistant Examiner—John L. Beres
(74) Attorney, Agent, or Firm—Nixon Peabody LLP; David S. Safran

(57) ABSTRACT

The invention relates to a flat gasket, on the main sealing faces of which are arranged one or several narrow flat sealing ridges, in the region of which an increased surface pressure and deformability are generated, whereby improved micro-sealing is attained. The invention further concerns a method for producing stamping moulds, in particular for stamping said flat gaskets according to the invention.

26 Claims, 2 Drawing Sheets

FLAT GASKET AND METHOD OF PRODUCING THE SAME

FIELD OF THE INVENTION

Figure 1A:
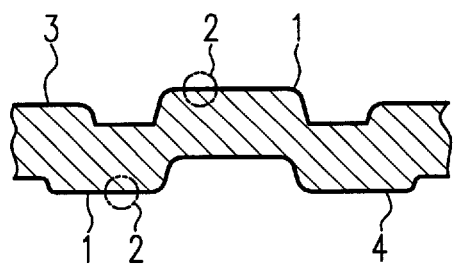

The invention relates to flat gaskets, which for example can be used as cylinder head gaskets or exhaust gaskets.

BACKGROUND OF THE INVENTION

Flat gaskets must, on the one hand, adjust themselves to irregularities in the faces to be sealed (micro-sealing) and, on the other hand, absorb the preliminary tension imparted by the screw forces during continuous duty without further deformation.

To improve micro-sealing the flat gaskets can be provided with a soft top coating, which is made of soft metal or plastic. In order to attain an improved seal, the coating should firstly be soft, so that it adapts well to the irregularities of the mating faces to be sealed in a cold static state, even during installation. Secondly, the sealing effect should also continue to exist during subsequent operation over as long a time of use as possible. In the case of severe dynamically stressed gaskets, such as cylinder head gaskets or exhaust gaskets, which work at high temperatures and under severe pressure loading, there is a tendency for the soft coatings of blowing out, so that adequate sealing is no longer assured. Therefore, flat gaskets attaining a good seal under the said conditions were required.

SUMMARY OF THE INVENTION

It is an object of the invention, therefore, to provide flat gaskets, which, even upon installation, adapt themselves to the mating faces to be sealed and lead to a good micro-seal and which also do not lose their sealability in subsequent operation when subjected to high surface pressure and high temperature.

This object is achieved by the flat gasket according to claim 1. Further embodiments of the flat gaskets according to the invention are described in claims 2 to 8.

On the one hand the term "flat gasket" here includes single-piece as well as multi-piece gaskets, such as for example, composite metal gaskets and soft material gaskets having metal edging around the openings to be sealed. On the other hand the term relates to such flat gaskets, which elastically adapt to changing pressure loads during operation, as well as to gaskets made of pressure-resistant material, which under operating conditions are not deformable in thickness. Normally, the gaskets according to the invention are made of metal, for example, aluminium. However, they can also be made from heat-resistant plastic or similar materials.

The gaskets according to the invention are characterized in that they comprise one or several high pressure lines in the region of their main sealing faces, hereinafter denoted as sealing ridges. These sealing ridges are very small compared with the main sealing faces and form regions of greater surface pressure and easier deformability. Such construction of the flat gaskets leads to an improved seal, even during installation.

The invention is described hereinafter with reference to single-piece gaskets made of pressure-resistant, non-deformable material, without restricting the invention to such gaskets. The following description applies similarly for the other types of gaskets mentioned above.

The single-piece pressure-resistant gaskets referred to in the following have a relief-like surface configuration. In variance to other gaskets they are formed such that they are already adapted to suit the topography of the mating faces to be sealed even before being installed. Such a flat gasket in the installed state and under operating conditions is pressure resistant and cannot be deformed in the thickness.

The relief-like functional faces of these flat gaskets according to the invention comprise main sealing faces, which have the function of sealing and bearing load and serve to absorb preliminary tension forces, which arise due to the forces of the screws. They are thus both sealing faces and bearing faces at the same time. In the flat gaskets according to the invention these main sealing faces are designed in their width so that their surface pressure is relatively low. Within the main sealing faces are one or several embossed sealing ridges. These sealing ridges are very narrow compared with the width of the main sealing face, and they only project by just a small amount in height above the main sealing face. In the vicinity of these sealing ridges a region of greater surface pressure and easier deformability compared with the remaining portion of the functional faces results. Due to this easier deformability and greater surface pressure, an improved seal can be attained even during installation.

Sealability can be further increased by the application of a coat. By the configuration of the functional faces according to the invention it is possible to choose an essentially harder, more resistant coat for continuous duty, so that the gasket will attain a better sealability right from the start.

Firstly, the gasket according to the invention enables superior micro-sealing to be achieved even during installation. Secondly, the problem of blowing out of the coating can be avoided, so that even during continuous duty under high temperature and pressure loading an excellent sealability is assured.

It is generally known that the adding of narrow, raised sealing faces can, under exposure to the same sealing pressure, lead to an improvement in the sealing properties. The main difference between the gaskets according to the invention and those of the state-of-the-art exists in the dimensions of the sealing ridges. According to the invention it is essential that the sealing ridges only slightly protrude over the main sealing faces of the gasket surface and, compared with the width of the main sealing faces, are very narrow. For example, the sealing ridges on cylinder head gaskets (the main sealing faces of which normally having a width of 1.3 to 3 mm) generally have a width of 0.1 to 0.5 mm. The width should, preferably, be 0.3 to 0.4 mm. The height of the sealing ridge in this case is normally 0.01 to 0.03 mm. Surprisingly, these small dimensions suffice to increase surface pressure and deformability in this region, such that micro-sealing can be considerably improved. However, in so doing, care is taken to avoid the sealing ridges sinking into the mating face to be sealed.

In contrast to conventional multi-layered steel gaskets, the single-piece gasket according to the invention has the advantage of being much simpler to construct. The single-piece construction requires no additional steps in applying any further seals or edging strips made of another material.

Even in the case of multi-layered gaskets, combinations of support lines and sealing faces—however in separated form—are known. For example, a sealing bead having a narrow compressive face can be arranged behind a bearing face. On gaskets having a predetermined distribution of thickness, the bearing face prevents vertical movement in said region, due to preliminary tension existing under all operating conditions. However, in the region adjacent to the bearing faces vertical movements in gap of the seal can occur in operation as a result of angular movements. Therefore, the narrow sealing faces on such an adjacent arrangement must be designed so that they can resiliently follow any minor displacement. In the configuration according to the invention this is not necessary, since the sealing faces lie within the bearing faces and these provide necessary rigidity to prevent movement.

Even on resiliently deformable gaskets, improvements in sealing can be attained, in that sealing ridges are applied additionally to main sealing faces. The sealing ridges, in differing from hitherto known designs, are, as noted, smaller in their dimensions. Due to the increased surface pressure and easier deformability in the region of the sealing ridges, sealing at the installation stage con be improved even further in comparison to conventional resiliently deformable gaskets.

BRIEF DESCRIPTION OF THE PREFERRED EMBODIMENTS

Figure 4:
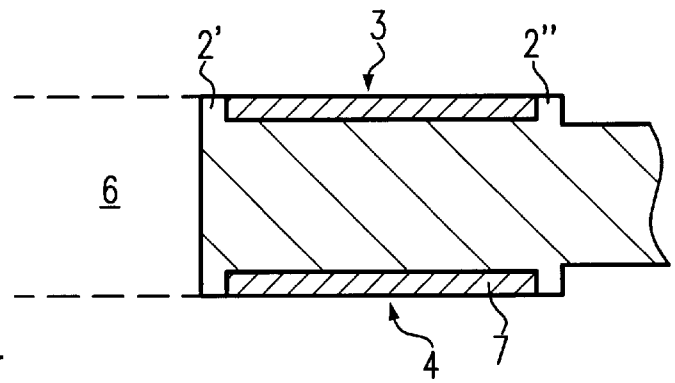
Figure 5:
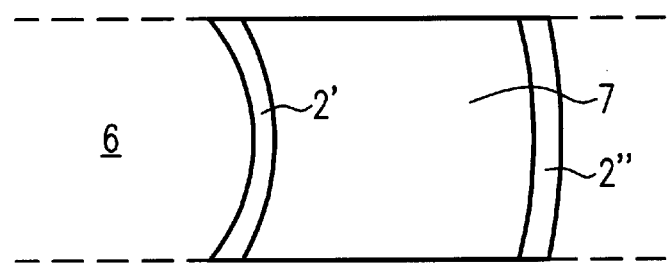

The gaskets according to the inventions are now explained in more detail with reference to the drawings. Schematically depicted in these are FIG. 1 to FIG. 3 partial cross sections through a gasket according to the invention; the figures on the right-hand side are enlargements of the representation on the left in the region of the encircled portions;

FIG. 4 a partial cross section through another gasket according to the invention in the region adjacent to the combustion chamber;

FIG. 5 a plan view of the detail of the gasket depicted in FIG. 4; and

FIG. 6 and

Figure 7:
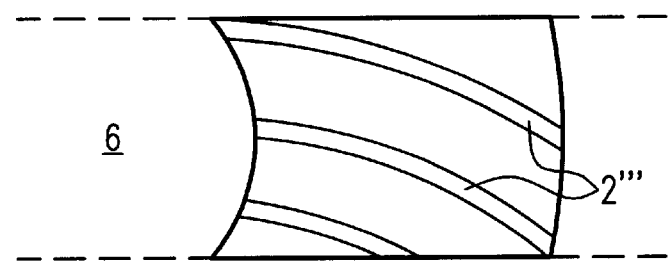

FIG. 7 other embodiments of the gasket portion shown in FIG. 5

DETAILED DESCRIPTION OF THE PREFERRED EMBODIMENTS

Figure 1B:
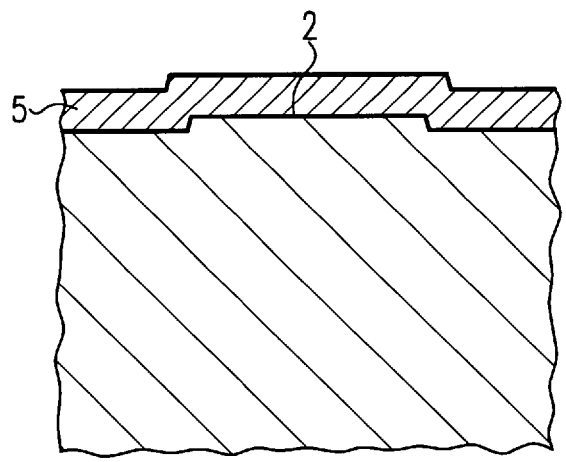
Figure 2:
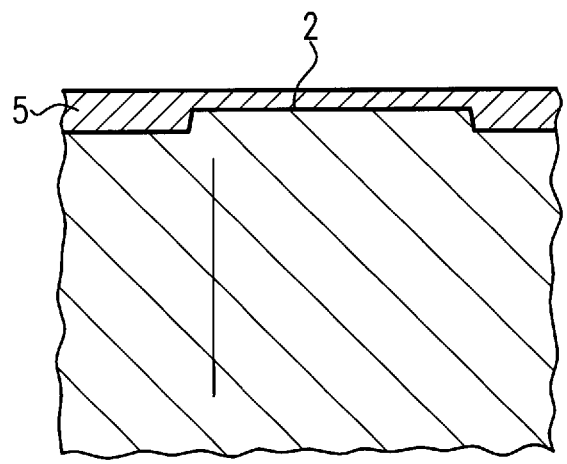
Figure 3:
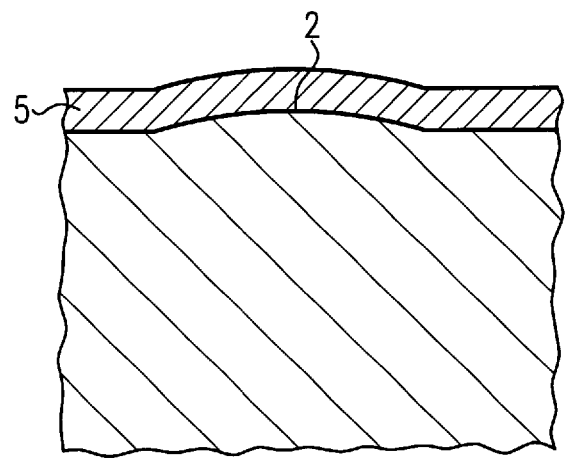

FIGS. 1 to 3 show partial cross sections through single-piece flat gaskets according to the invention, for example, in the region of their functional faces, e. g. in the vicinity of a through-opening. The through-opening can, for example, be the combustion chamber or a passageway for oil or coolant of a cylinder head gasket. The right hand illustrations are enlargements of the left hand side in the encircled portions, in which are arranged sealing ridges, and which depict differing possible embodiments in this region.

The main sealing faces 1 of the gasket depicted in the lost figure have a sealing ridge 2 on the top side 3 and the bottom side 4 of the gasket respectively. Nevertheless, it is possible to apply one or several sealing ridges to just one side of the gasket, or to arrange more than one sealing ridge per bearing face on both sides of the gasket. A sealing ridge can be intrinsically enclosed or even run partly in sections within a main sealing face. The sealing ridges can be arranged in a circular form around the respective opening to be sealed. Preferably, they should annularly surround the through-opening. In the latter case, the sealing ridge can be arranged around individual sections of the circumference of the through-opening, or preferably it can extend around the entire circumference of the through-opening.

Width and height of the sealing ridges are small compared with the dimensions of the main sealing faces. Depending upon size, the width of the sealing ridges is smaller by about a power of ten than the width of the main sealing face, whilst the height of the sealing ridges is smaller by about a power of ten than their width. As noted above, the width of the sealing ridges should be appropriately in the range of 0.1 to 0.5 mm (preferably between 0.3 and 0.4 mm) for a cylinder head gasket having a main sealing face of 1.3 to 3 mm width. Appropriately the height of the sealing ridges is, in this case, 0.01 to 0.03 mm.

Due to the differing configuration of the two surfaces for the top and bottom sides of the gasket, the gasket can be matched specifically to suit the differing materials of the mating faces to be sealed. An illustrative example would be a cylinder head gasket, which is to be installed between a cast-iron block and an aluminium head. In such cases both the number of sealing ridges as well as their height and width can be chosen accordingly for the various sides of the gasket If several sealing ridges are arranged on one side of a main sealing face, the sealing ridges can either be equal in height and width or be of differing height and/or width.

Due to the described configuration of the functional faces, a much greater surface pressure occurs during installation in the vicinity of the sealing ridges 2 than in the region of the other functional faces, and as a result, these regions are more easily deformable, whereupon an improved seal is achieved upon installation. In the first few hours of operation the gasket beds down, wherein the sealing ridges can be flattened fully or partially in their height. Due to the comparatively small height of the sealing ridges, any sinking into the mating faces is prevented.

Micro-sealing can be further improved by applying a coat 5 on one or both sides of the gasket.

As a coating material, any conventionally utilized material for coating of gaskets can be used. For example, the functional face can be coated with heat-resistant plastic. Also well suited are one or several top coats of soft metal. For gaskets according to the invention, it is preferable to choose a coat made of a heat-resistant plastic.

The top coat 5 can be of uniform thickness or of differing thickness. FIG. 1b shows functional faces having a cornered sealing face and a coat of uniform thickness. In contrast to this, the functional faces in FIG. 2 are coated with a top coat of variable thickness, so that the coat in total has a closed top line.

Uniform thick coatings can be produced by applying the coating material as a powder. Coatings of variable thickness can be attained in that the coating material is applied in a liquid state. The coating is then thinner in the vicinity of the projecting sealing ridges than in the remaining portion of the functional faces. Preferably, functional faces having only slightly raised sealing ridges receive a coating of uniform coat thickness, whilst functional faces having more pronouncedly raised sealing ridges receive coatings of variable coat thickness, which lead to the formation of a closed top line.

FIG. 3 shows a functional face, which once again is coated with a coating of uniform coat thickness. In contrast to FIG. 1b, the sealing ridges however have rounded-off edges.

FIG. 4 depicts another preferred embodiment of the gasket according to the invention and shows it in partial cross section, in the region directly adjacent to a combustion chamber opening 6. The gasket comprises, in each case, on the top side 3 and the bottom side 4, two sealing ridges 2', 2", which annularly surround the combustion chamber opening 6, which can be seen in FIG. 5, where a gasket segment of the gasket of FIG. 4 is illustrated in plan view. The front sealing ridges 2' run along the front sealing edge directly at the edge of the combustion chamber. Between the front and rear sealing ridges is enclosed a material 7, which can be deformed more easily than the gasket material surrounding it. It can, for example, either be an inlay of elastomeric plastic or soft metal.

The sealing ridges 2', 2", surrounding the inlay 7, protect the latter from too much mechanical and thermal loading, which can lead to rapid wear or blowing-out of the soft material inlay 7. This, for example, occurs by the fact that the front sealing ridges screen the soft material inlay 7 from the hot combustion gases in the combustion chamber, and deviate heat in the direction towards the cylinder head and cylinder block. In the case shown in FIGS. 4 and 5, the sealing ridges form closed lines supporting the seal against the combustion chamber and thus protect the soft material inlay from severe mechanical loading. This effect can be enhanced by further sealing ridges, which run between front and rear sealing ridges.

Figure 6:
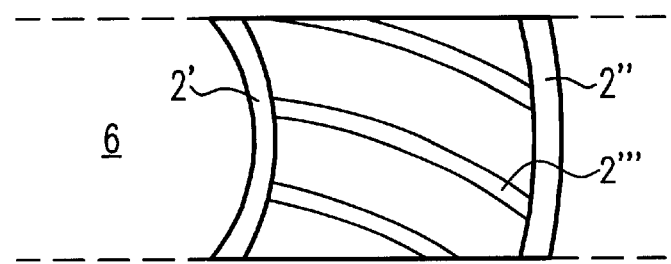

FIG. 6 shows an embodiment having sealing ridges 2''' running transversely to the front and rear sealing ridges 2', 2". The number, form and path of the sealing ridges 2''' may be varied as required.

Another modification can be seen in FIG. 7. It corresponds to that of FIG. 6, apart from the fact that the sealing ridges 2' and 2" effecting the sealing are omitted.

Even the gaskets illustrated in FIGS. 4 to 7 can be provided with a single-sided or double-sided full-coating or part-coating for improving micro-sealing, additional to the soft material inlay 7. For more details the description relating to FIG. 1 should be referred to.

The described gaskets can be manufactured in a conventional manner by known prior art processes. For example, the raised sealing ridge can be obtained by removing material or by forming without removing material from the main sealing face.

It is particularly advantageous to carry out manufacture using a stamping process. Any suitable method can be employed to manufacture a stamping mould. For example, the depressions in the stamping mould can be produced by chemical removal, e.g. by means of etching or by means of an oxidation process or with the aid of laser technology. If the requirements for accuracy are particularly stringent, spark erosion can be used too for producing the depressions. It has, however, proven to be particularly appropriate to draw or roll the corrugations for the sealing ridges in a stamping mould by using a sphere or a small wheel, the stamping mould in the case of single-piece gaskets being adapted to the topography of the mating faces to be sealed. Such a method is a further object of the invention. In this method the sphere or the small wheel is guided over the preliminary manufactured stamping mould along the required region in which the sealing face impressions are to be situated. For example, a hardened sphere, arranged in a blind hole, is attached in a quill of a universal milling machine and is guided along the xy-coordinates over the functional faces of the flat gasket reproduced in the stamping mould, so that impressions for the sealing ridges are formed in the required position and width. In this stamping process the quill is not rotated. The depth of the impression (i. e. the height of the sealing ridges in the gasket) is controlled primarily by the setting of the spring force acting upon the sphere at the constant difference in height to the z axis The sphere is guided at a predetermined force over the stamping mould, such that an impression relative to the height of the stamping face (functional face) is produced of basically constant depth.

Instead of a sphere a small wheel can be used, which is drawn along the required x-y coordinates over the stamping face. The wheel envelope may have different configurations such as a pointed, a trapezoidal or rounded-off profile.

The described method enables an extremely accurate mould to be stamped for the sealing ridges, even using stamping plates already hardened.

The method is not limited to the production of stamping moulds for gaskets, but is suitable in general for manufacturing stamping moulds, in which fine surface structures having a basically constant depth relative to the height of the stamping face are to be produced.

What is claimed is:

1. A flat gasket comprising at least one through-opening, which is sealed by a main sealing face that has a sealing and bearing function and that absorbs preliminary tension, wherein, on said main sealing face, at least one sealing ridge is arranged, said at least one sealing ridge extending around at least one of a section and entire circumference of said through opening, wherein a width of each sealing ridge is smaller by an order of magnitude of a power of ten than a width of said main sealing face, and wherein a height of each sealing ridge is smaller by an order of magnitude of a power of ten than a width of each sealing ridge.

2. The flat gasket according to claim 1, wherein said gasket is a cylinder head gasket or an exhaust gasket.

3. A flat gasket according to claim 2, wherein for a width of said main sealing face ranging from 1.3 to 3 mm, each sealing ridge has a width ranging from 0.1 to 0.5 mm and a height ranging from 0.01 to 0.03 mm.

4. A flat gasket according to claim 1, wherein said at least one sealing ridge is constructed as a sealing ring, which completely surrounds said through-opening in said flat gasket.

5. A flat gasket according to claim 4, further comprising at least two sealing ridges, which are arranged concentrically around said through-opening.

6. A flat gasket according to claim 4, wherein said at least one sealing ridge is arranged at an edge of said through-opening.

7. A flat gasket according to claim 5, wherein between said at least two sealing ridges is arranged a soft material inlay.

8. A flat gasket according to claim 7, wherein said soft material inlay is made of a soft metal or an elastomeric plastic.

9. A flat gasket according to claim 4, wherein said at least one sealing ridge is arranged on each side of said gasket.

10. A flat gasket according to claim 4, further comprising at least one annular sealing ridge, wherein between two annular sealing ridges are arranged said at least one sealing ridge having a different orientation than said annular sealing ridges.

11. A flat gasket according to claim 10, wherein said at least one sealing ridge essentially runs parallel to another said at least one sealing ridge, and each said at least one sealing ridge essentially runs transversely or diagonally to said annular sealing ridges.

12. A flat gasket according to claim 1, further comprising a plurality of sealing ridges that, commencing from said through-opening, essentially extends outwardly at least one of radially and at an angle.

13. A flat gasket according to claim 12, wherein said plurality of sealing ridges essentially run parallel.

14. A flat gasket according to claim 12, wherein between said plurality of sealing ridges is arranged a soft material inlay.

15. A flat gasket according to claim 14, wherein said soft material inlay is made of soft metal or an elastomeric plastic.

16. A flat gasket according to claim 4, wherein said casket is a cylinder head gasket, and said through-opening is a combustion chamber opening.

17. A flat gasket according to claim 1, wherein said at least one sealing ridge is fabricated out of said main sealing face by at least one of removing material or by forming without removing material.

18. A flat gasket according to claim 1, wherein said casket is made of metal.

19. A flat gasket according to claim 1, wherein each side of said gasket is provided at least one of fully or partially with a coating.

20. A flat gasket according to claim 19, wherein said coating is made of at least one of plastic or metal, which is softer than a material from which said gasket is manufactured.

21. A flat gasket according to claim 20, having a plastic coating, which, for a reduced height of said at least one sealing ridge, has a uniform coat thickness and which, for a greater height of said at least one sealing ridge, has a coat thickness which is less in a region of said at least one sealing ridge than in a region of said main sealing face, so that a uniformly thick coating line results.

22. A flat gasket according to claim 2, wherein for a width of said main sealing face ranging from 1.3 to 3 mm, each sealing ridge has a width ranging from 0.3 to 0.4 mm and a height ranging from 0.01 to 0.03 mm.

23. A method for producing a flat gasket having main sealing face and at least one through-opening in a stamping mold having an essentially uniform depth relative to a height of the surrounding stamped surface, wherein depressions are produced by at least one of a sphere and a small wheel being guided along required x-y coordinates under an essentially constant pressure, and wherein the step of producing said depressions includes the step of forming at least one sealing ridge arranged on said gasket around at least one of a section and entire circumference of said at least one through-opening in a manner causing each sealing ridge to have a width which is size smaller by an order of magnitude of a power of ten than a width of said main sealing face, and in a manner causing each sealing ridge to have a height which is smaller by an order of magnitude of a power of ten than the width thereof.

24. A method according to claim 22, wherein said depressions are produced using a sphere made of hardened metal, which is arranged in a blind hole and is fixed in a quill of a universal milling machine.

25. A method according to claim 22, wherein said depressions are produced using a small wheel, which is drawn over a surface of said stamping mold.

26. A method according to claim 25, wherein said small wheel has a wheel envelope having a pointed, trapezoidal or rounded profile.

* * * * *